(12) United States Patent
Nomura

(10) Patent No.: US 8,752,009 B2
(45) Date of Patent: Jun. 10, 2014

(54) SOURCE CODE COMPARISON DEVICE, SOURCE CODE COMPARISON METHOD AND SOURCE CODE COMPARISON PROGRAM

(75) Inventor: Yoshiaki Nomura, Tokyo (JP)

(73) Assignee: NEC Corporation, Tokyo (JP)

(*) Notice: Subject to any disclaimer, the term of this patent is extended or adjusted under 35 U.S.C. 154(b) by 104 days.

(21) Appl. No.: 13/591,854

(22) Filed: Aug. 22, 2012

(65) Prior Publication Data
US 2013/0074035 A1 Mar. 21, 2013

(30) Foreign Application Priority Data

Sep. 20, 2011 (JP) ................................. 2011-204924

(51) Int. Cl.
G06F 9/44 (2006.01)
(52) U.S. Cl.
USPC ............................ 717/110; 717/112; 717/126
(58) Field of Classification Search
USPC .................. 717/100–114, 124–135, 142–143
See application file for complete search history.

(56) References Cited

U.S. PATENT DOCUMENTS

| 4,048,728 | A | * | 9/1977 | Nason et al. .................... 434/219 |
| 5,201,050 | A | * | 4/1993 | McKeeman et al. ............ 717/111 |
| 5,485,409 | A | * | 1/1996 | Gupta et al. ..................... 726/25 |
| 6,804,682 | B1 | | 10/2004 | Kemper et al. ........................ 1/1 |
| 6,807,548 | B1 | * | 10/2004 | Kemper ................................. 1/1 |
| 7,496,892 | B2 | * | 2/2009 | Nuss ................................ 717/114 |
| 7,624,304 | B2 | * | 11/2009 | Thiagarajan et al. ............ 714/25 |
| 8,352,921 | B2 | * | 1/2013 | Jegoulev et al. ................ 717/131 |
| 2005/0015752 | A1 | * | 1/2005 | Alpern et al. ................... 717/131 |
| 2006/0080578 | A1 | * | 4/2006 | Thiagarajan et al. ............. 714/38 |
| 2007/0089092 | A1 | * | 4/2007 | Schmidt et al. ................. 717/126 |
| 2008/0196000 | A1 | * | 8/2008 | Fernandez-Ivern et al. .. 717/101 |
| 2009/0044177 | A1 | * | 2/2009 | Bates et al. ..................... 717/131 |

(Continued)

FOREIGN PATENT DOCUMENTS

| JP | 08194611 A | 7/1996 |
| JP | 2006277127 A | 10/2006 |

OTHER PUBLICATIONS

Ayewah et al., "Evaluating static analysis defect warnings on production software", Proceeding PASTE '07 Proceedings of the 7th ACM SIGPLAN-SIGSOFT workshop on Program analysis for software tools and engineering, pp. 1-7.*

(Continued)

Primary Examiner — Don Wong
Assistant Examiner — Marina Lee
(74) Attorney, Agent, or Firm — Sughrue Mion, PLLC

(57) ABSTRACT

A source code comparison device includes a difference extraction portion extracting a difference between a source code before correction and the source code after correction, a syntax analysis portion dividing the extracted difference into divided differences which are portions corresponding to components usable in the source code, and generating a syntax analysis result having associated the divided difference with the component corresponding to the divided difference, a feature analysis portion setting a feature division for each of the divided differences included in the syntax analysis result, and an output portion outputting a comparison result having associated the divided difference with the feature division set for the divided difference. The feature analysis portion sets the feature division associated with the component in a correction history for the divided difference associated with the component in the syntax analysis result.

7 Claims, 15 Drawing Sheets

(56) References Cited

U.S. PATENT DOCUMENTS

| | | | |
|---|---|---|---|
| 2010/0333069 A1* | 12/2010 | Chandra et al. | 717/126 |
| 2011/0035733 A1* | 2/2011 | Horning et al. | 717/140 |
| 2012/0096446 A1* | 4/2012 | Miceli | 717/141 |
| 2012/0324427 A1* | 12/2012 | Provost et al. | 717/126 |
| 2013/0074035 A1* | 3/2013 | Nomura | 717/110 |

OTHER PUBLICATIONS

Kagdi et al., "Who can Help Me with this Source Code CHange ?" 2008, retrieved from <http://ieeexplore.ieee.org/stamp/stamp.jsp?tp=&arnumber=4658064>,pp. 157-166.*

* cited by examiner

FIG. 2

| DIFFERENCE | COMPONENT |
|---|---|
| DIFFERENCE 1 | FUNCTION 1 |
| DIFFERENCE 2 | VARIABLE 1, STRUCTURE 1 |
| DIFFERENCE 3 | FUNCTION 2 |

FIG. 3

| DIFFERENCE | DIVIDED DIFFERENCE | COMPONENT |
|---|---|---|
| DIFFERENCE 1 | DIFFERENCE 1 | FUNCTION 1 |
| DIFFERENCE 2 | DIFFERENCE 2a | VARIABLE 1 |
| | DIFFERENCE 2b | STRUCTURE 1 |
| DIFFERENCE 3 | DIFFERENCE 3 | FUNCTION 2 |

FIG. 4

| HISTORY NUMBER | COMPONENT | FEATURE DIVISION |
|---|---|---|
| 1 | FUNCTION 1 | FEATURE 1 |
| 1 | VARIABLE 1 | FEATURE 1 |
| 2 | STRUCTURE 1 | FEATURE 2 |

FIG. 5

| DIFFERENCE | DIVIDED DIFFERENCE | COMPONENT | FEATURE DIVISION |
|---|---|---|---|
| DIFFERENCE 1 | DIFFERENCE 1 | FUNCTION 1 | FEATURE 1 |
| DIFFERENCE 2 | DIFFERENCE 2a | VARIABLE 1 | FEATURE 1 |
| | DIFFERENCE 2b | STRUCTURE 1 | FEATURE 2 |
| DIFFERENCE 3 | DIFFERENCE 3 | FUNCTION 2 | NEW FEATURE |

FIG. 6

| DIFFERENCE | DIVIDED DIFFERENCE | COMPONENT | FEATURE DIVISION |
|---|---|---|---|
| DIFFERENCE 1 | DIFFERENCE 1 | FUNCTION 1 | FEATURE 1 |
| DIFFERENCE 2 | DIFFERENCE 2a | VARIABLE 1 | FEATURE 1 |
|  | DIFFERENCE 2b | STRUCTURE 1 | FEATURE 2 |
| DIFFERENCE 3 | DIFFERENCE 3 | FUNCTION 2 | FEATURE 3 |

FIG. 7

| HISTORY NUMBER | COMPONENT | FEATURE DIVISION |
|---|---|---|
| 1 | FUNCTION 1 | FEATURE 1 |
| 1 | VARIABLE 1 | FEATURE 1 |
| 2 | STRUCTURE 1 | FEATURE 2 |
| 3 | FUNCTION 1 | FEATURE 1 |
| 3 | VARIABLE 1 | FEATURE 1 |
| 3 | STRUCTURE 1 | FEATURE 2 |
| 3 | FUNCTION 2 | FEATURE 3 |

FIG. 13

| FEATURE DIVISION | CORRECTION RATIO OF FUNCTION 1 | CORRECTION RATIO OF VARIABLE 1 | CORRECTION RATIO OF STRUCTURE 1 |
|---|---|---|---|
| FEATURE 1 | 100% | 100% | 50% |
| FEATURE 2 | 0% | 100% | 0% |

FIG. 14

|  | FUNCTION 1 | VARIABLE 1 | STRUCTURE 1 |
|---|---|---|---|
| PAST CORRECTION RATIO OF FEATURE 1 | 100% | 100% | 50% |
| ANY CURRENT CORRECTION TO FEATURE 1 | ○ | × | × |

SOURCE CODE COMPARISON DEVICE, SOURCE CODE COMPARISON METHOD AND SOURCE CODE COMPARISON PROGRAM

INCORPORATION BY REFERENCE

The present application claims priority from Japanese Patent Application No. 2011-204924, filed on Sep. 20, 2011 in Japan, the disclosure of which is incorporated herein by reference in its entirety.

TECHNICAL FIELD

The present invention relates to a source code comparison device, a source code comparison method, and a source code comparison program.

BACKGROUND ART

Conventionally, as a technique for confirming the content of a corrected source code, such a method is utilized as makes use of the diff command of UNIX (trademark) for example, compares the text source codes before and after the correction in line units, and displays the difference between the source codes. However, with such difference of texts alone, the user himself or herself has to determine to which function or feature each correction corresponds. Therefore, if there are mixed corrections with respect to a plurality of features, it becomes difficult to associate the corrected places with the features. There are techniques for associating corrected places with features such as those disclosed in the following Patent Documents 1 and 2.

The technique disclosed in Patent Document 1 compares uncorrected and corrected source codes to extract the corrected places, and associates the corrected places with variable names or function names by using a syntax analysis result of the source codes. The technique disclosed in Patent Document 2 hierarchically structures a source code in advance to divide the same into each hierarchy of program, module, file and function, and associates the corrected places with hierarchical features by comparing the uncorrected and corrected source codes in respective hierarchical units of the program, module, file and function.

[Patent Document 1] JP 08-194611 A
[Patent Document 2] JP 2006-277127 A

It is not sufficient to use the syntax analysis result alone as in Patent Document 1 for association with modules, files and the like in superordinate hierarchies higher than variable names and function names. Further, in Patent Document 2, since it is necessary to pre-define and pre-register the hierarchical structures of programs, modules and the like, if the design information is not available, for example, then it is conceivable to omit the registration in adding the information, thereby being difficult for management.

SUMMARY

The present invention is configured to solve the above problem, and an exemplary object thereof is to provide a source code comparison device, a source code comparison method and a source code comparison program capable of correctly and simply associating the corrected places with the features.

An aspect in accordance with the present invention provides a source code comparison device including: a difference extraction portion extracting a difference between a source code before correction and the source code after correction; a syntax analysis portion dividing the extracted difference into divided differences which are portions corresponding to components usable in the source code, and generating a syntax analysis result having associated the divided difference with the component corresponding to the divided difference; a feature analysis portion setting a feature division for each of the divided differences included in the syntax analysis result; and an output portion outputting a comparison result having associated the divided difference with the feature division set for the divided difference, wherein if the component included in the syntax analysis result is included in a correction history having associated the component with the feature division, then the feature analysis portion is configured to set the feature division associated with the component in the correction history for the divided difference associated with the component in the syntax analysis result.

Another aspect in accordance with the present invention provides a source code comparison method including: a difference extraction step of extracting a difference between a source code before correction and the source code after correction; a syntax analysis step of dividing the extracted difference into divided differences which are portions corresponding to components usable in the source code, and generating a syntax analysis result having associated the divided difference with the component corresponding to the divided difference; a feature analysis step of setting a feature division for each of the divided differences included in the syntax analysis result; and an output step of outputting a comparison result having associated the divided difference with the feature division set for the divided difference, wherein if the component included in the syntax analysis result is included in a correction history having associated the component with the feature division, then the feature analysis step is configured to set the feature division associated with the component in the correction history for the divided difference associated with the component in the syntax analysis result.

Still another aspect in accordance with the present invention provides a computer-readable medium storing a source code comparison program comprising instructions for causing a computer to carry out a process including: a difference extraction step of extracting a difference between a source code before correction and the source code after correction; a syntax analysis step of dividing the extracted difference into divided differences which are portions corresponding to components usable in the source code, and generating a syntax analysis result having associated the divided difference with the component corresponding to the divided difference; a feature analysis step of setting a feature division for each of the divided differences included in the syntax analysis result; and an output step of outputting a comparison result having associated the divided difference with the feature division set for the divided difference, wherein if the component included in the syntax analysis result is included in a correction history having associated the component with the feature division, then the feature analysis step is configured to set the feature division associated with the component in the correction history for the divided difference associated with the component in the syntax analysis result.

According to the present invention, it is possible to correctly and simply associate the corrected places with the features.

BRIEF DESCRIPTION OF DRAWINGS

FIG. 2 is a diagram exemplifying a syntax analysis result;

FIG. 3 is a diagram exemplifying the syntax analysis result after division;

FIG. 4 is a diagram exemplifying a data configuration of a correction history table;

FIG. 5 is a diagram exemplifying a temporary feature analysis result;

FIG. 6 is a diagram exemplifying a feature analysis result;

FIG. 7 is a diagram exemplifying another data configuration of the correction history table;

FIG. 13 is a diagram exemplifying a correction ratio of each component calculated according to each feature division;

FIG. 14 is a diagram exemplifying a corresponding relationship between the past correction ratio and the current correction situation in component units of the feature division.

EXEMPLARY EMBODIMENT

Figure 1:
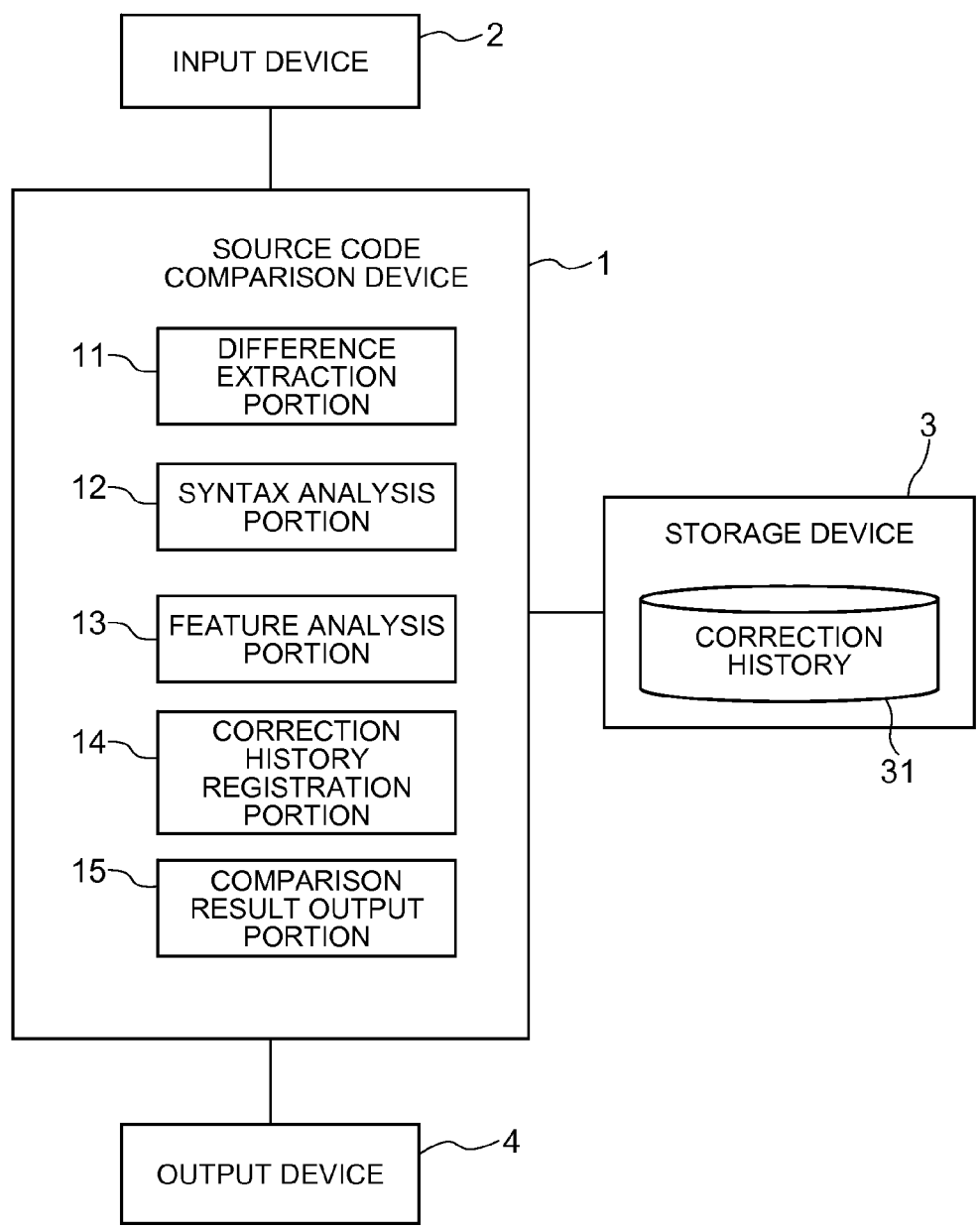
FIG. 1 is a diagram exemplifying a configuration of a source code comparison device in accordance with an exemplary embodiment of the present invention.

Hereinbelow, referring to the accompanying drawings, explanations will be made with respect to a preferred exemplary embodiment of a source code comparison device, a source code comparison method and a source code comparison program in accordance with the present invention.

First, referring to FIG. 1, explanations will be made with respect to a functional configuration of a source code comparison device in the exemplary embodiment. The source code comparison device 1 has, functionally for example, a difference extraction portion 11, a syntax analysis portion 12, a feature analysis portion 13, a correction history registration portion 14, and a comparison result output portion 15.

Here, the source code comparison device 1 is configured physically to include, for example, a CPU (Central Processing Unit), a memory, and an input and output interface. The memory includes elements such as a ROM (Read Only Memory) and an HDD (Hard Disk Drive) for storing programs and data to be processed by the CPU, a RAM (Random Access Memory) used mainly as various working areas for control processes, and the like. These elements are connected to each other via a bus. The CPU can realize the function of each portion in the source code comparison device 1 by executing programs stored in the ROM, and processing the source codes and messages received via the input and output interface, the data loaded in the RAM, and the like.

The difference extraction portion 11 compares the uncorrected source code with the corrected source code to extract the difference. As a method for comparing the source codes, it is possible to use an ordinary text comparison processing. The difference extraction portion 11 enumerates the differences between the uncorrected source code and the corrected source code by successively comparing the corresponding texts of the source codes.

That is, the difference extraction portion 11 can be described as to extract the differences between the uncorrected source code and the corrected source code.

The syntax analysis portion 12 enumerates the components of the correction objects from the differences extracted by the difference extraction portion 11, and generates a syntax analysis result. The components are those usable in the source code such as the corresponding variables, functions, structures, and the like. FIG. 2 shows an example of the syntax analysis result. The syntax analysis result of FIG. 2 shows that as the differences of the source codes, "difference 1", "difference 2", and "difference 3" are extracted, while "function 1" is included in "difference 1" as the component, "variable 1" and "structure 1" are included in "difference 2" as the components, and "function 2" is included in "difference 3" as the component.

If there is a difference including a plurality of components, then the syntax analysis portion 12 divides the difference according to each component, and updates the syntax analysis result. This is due to the consideration of the fact that a difference including a plurality of components is extracted as a clump of differences in the case of correcting the plurality of components described adjacently in the source code. In such a case, the difference is to be divided according to each component. FIG. 3 shows an example of the syntax analysis result after the division. The syntax analysis result of FIG. 3 shows that because "difference 2" of FIG. 2 includes a plurality of components ("variable 1" and "structure 1"), this "difference 2" is divided into "difference 2a" corresponding to the component "variable 1", and "difference 2b" corresponding to the component "structure 1".

That is, the syntax analysis portion 12 can be described as to divide the difference extracted by the difference extraction portion 11 into divided differences which are the portions corresponding to the components, and generate a syntax analysis result associating the divided differences with the components corresponding to the divided differences.

The feature analysis portion 13 refers to a correction history table 31, determines feature divisions corresponding to the components included in the syntax analysis result, and generates a feature analysis result.

Referring to FIG. 4, a data configuration of the correction history table 31 will be explained. The correction history table 31 has, as data items for example, a history number item, a component item, and a feature division item. The history number item stores the identification number incremented at each time of comparing the uncorrected and corrected source codes. The component item stores the identification information for uniquely identifying the component of a correction object. The feature division item stores the identification information for uniquely identifying the feature to which a component belongs. The user can arbitrarily set a feature division such as to allow for identifying a feature realized by one component or a plurality of components.

That is, the correction history can be described as information associating the information for identifying a correction to the source code (the history number in the exemplary embodiment), the component, and the feature division.

The correction history table of FIG. 4 shows that with respect to a certain source code, by comparing the results before and after the first correction, the components "function 1" and "variable 1" belonging to the feature division "feature 1" are corrected, while by comparing the results before and after the second correction, the component "structure 1" belonging to the feature division "feature 2" is corrected.

If the correction history table 31 has a component included in the syntax analysis result, then the feature analysis portion 13 sets the feature division stored in the correction history table 31 in association with the component to the feature division of the feature analysis result corresponding to the component. If the correction history table 31 does no have a component included in the syntax analysis result, then the feature analysis portion 13 provisionally sets a division ("new feature", for example) indicating that it does not exist in the correction history to the feature division of the feature analysis result corresponding to the component.

If a "new feature" is provisionally set in the feature division, then the feature analysis portion 13 causes an output device 4 to display the feature analysis result at that point of time as a temporary feature analysis result, and urges the user to input the "new feature" to the provisionally set feature division. Thereafter, when accepting the input to the provisionally set feature division from the user, the feature analysis portion 13 updates the feature analysis result by changing the feature division of the provisionally set temporary feature analysis result to the inputted feature division.

FIG. 5 shows an example of the temporary feature analysis result. The temporary feature analysis result of FIG. 5 is generated based on the syntax analysis result of FIG. 3 and the correction history table of FIG. 4. Among the components in the syntax analysis result of FIG. 3, because the "function 1", "variable 1" and "structure 1" exist in the correction history table of FIG. 4, the feature divisions "feature 1", and "feature 1" and "feature 2", which are stored in respective association with the components in the correction history table, are set respectively to the feature divisions corresponding to the components "function 1", "variable 1" and "structure 1" of the temporary feature analysis result of FIG. 5. On the other hand, among the components in the syntax analysis result of FIG. 3, because the "function 2" does not exist in the correction history table of FIG. 4, the "new feature", which is the division indicating that it does not exist in the correction history, is provisionally set to the feature division corresponding to the component "function 2" of the temporary feature analysis result of FIG. 5.

FIG. 6 shows an example of the feature analysis result. The feature analysis result of FIG. 6 shows a state in which the feature division corresponding to the component "function 2" of the temporary feature analysis result of FIG. 5 is changed in the setting to "feature 3" inputted by the user.

That is, the feature analysis portion 13 can be described as to set the feature division associated with a component in the correction history for the divided difference associated with the component in the syntax analysis result when the component included in the syntax analysis result is also included in the correction history associating the component with the feature division.

Further, the feature analysis portion 13 can be described as to provisionally set, as the feature division, the information indicating that a component is not included in the correction history for the divided difference associated with the component in the syntax analysis result when the component included in the syntax analysis result is not included in the correction history, while urging the user to input the information for the provisionally set feature division.

In addition, the feature analysis portion 13 can be described as when accepting the information inputted by the user for the provisionally set feature division, it sets this information as the feature division for the divided difference by changing the provisionally set feature division to the accepted information.

In this manner, the feature analysis portion 13 can be described as to set the feature division for each of the divided differences included in the syntax analysis result.

The correction history registration portion 14 registers the correction history on the correction history table 31 based on the feature analysis result.

FIG. 7 shows an example of the updated correction history table. The correction history table of FIG. 7 is in a state of having updated the correction history table of FIG. 4 based on the feature analysis result of FIG. 6. The correction history table of FIG. 7 has additionally registered four groups of components and feature divisions included in the feature analysis result of FIG. 6 as the data corresponding to the history number "3" in the correction history table.

That is, the correction history registration portion 14 can be described as to store, into a storage device as the correction history, the information associating the feature division set for a divided difference by the feature analysis portion 13, with the component associated with the divided difference in the syntax analysis result.

The comparison result output portion 15 causes the output device 4 to display the comparison result indicating the result of comparing the uncorrected and corrected source codes. It is possible to use each item included in the feature analysis result to display the comparison result. The user can arbitrarily designate the items to be displayed in the comparison result from every item included in the feature analysis result.

Figure 8:
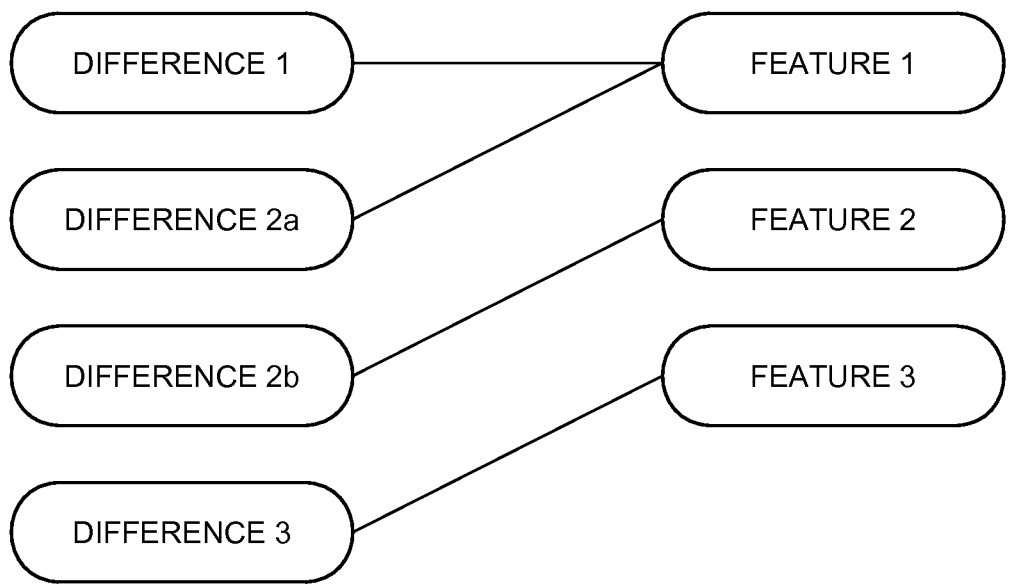
FIG. 8 is a diagram exemplifying a comparison result.

FIG. 8 shows an example of the comparison result. The comparison result of FIG. 8 is an example displayed by utilizing the divided differences and the feature divisions included in the feature analysis result. The comparison result of FIG. 8 shows that "difference 1" and "difference 2a" are extracted as the corrections about "feature 1", "difference 2b" is extracted as the correction about "feature 2", and "difference 3" is extracted as the correction about "feature 3".

Figure 9:
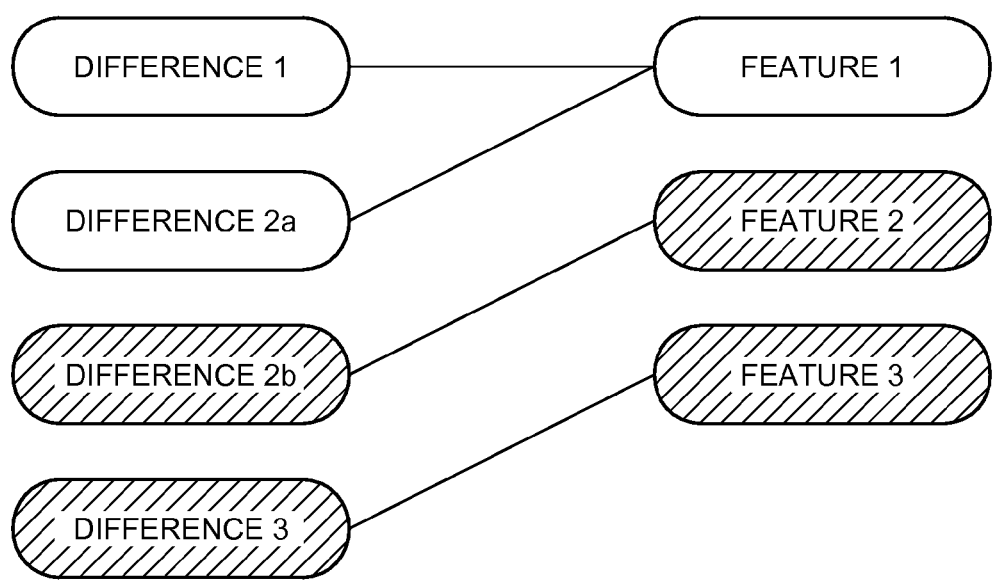
FIG. 9 is a diagram exemplifying another comparison result.

FIG. 9 shows an example of the comparison result displayed when the user has designated a specific feature as the output object. FIG. 9 shows the comparison result displayed when the user has designated "feature 1" as the output object. The comparison result of FIG. 9 shows only the comparison result about "feature 1" designated by the user among a plurality of corrected features. The user can use the query function, for example, to arbitrarily designate an output object.

That is, the comparison result output portion 15 can be described as to output a comparison result associating a divided difference with the feature division set for the divided difference.

Figure 10:
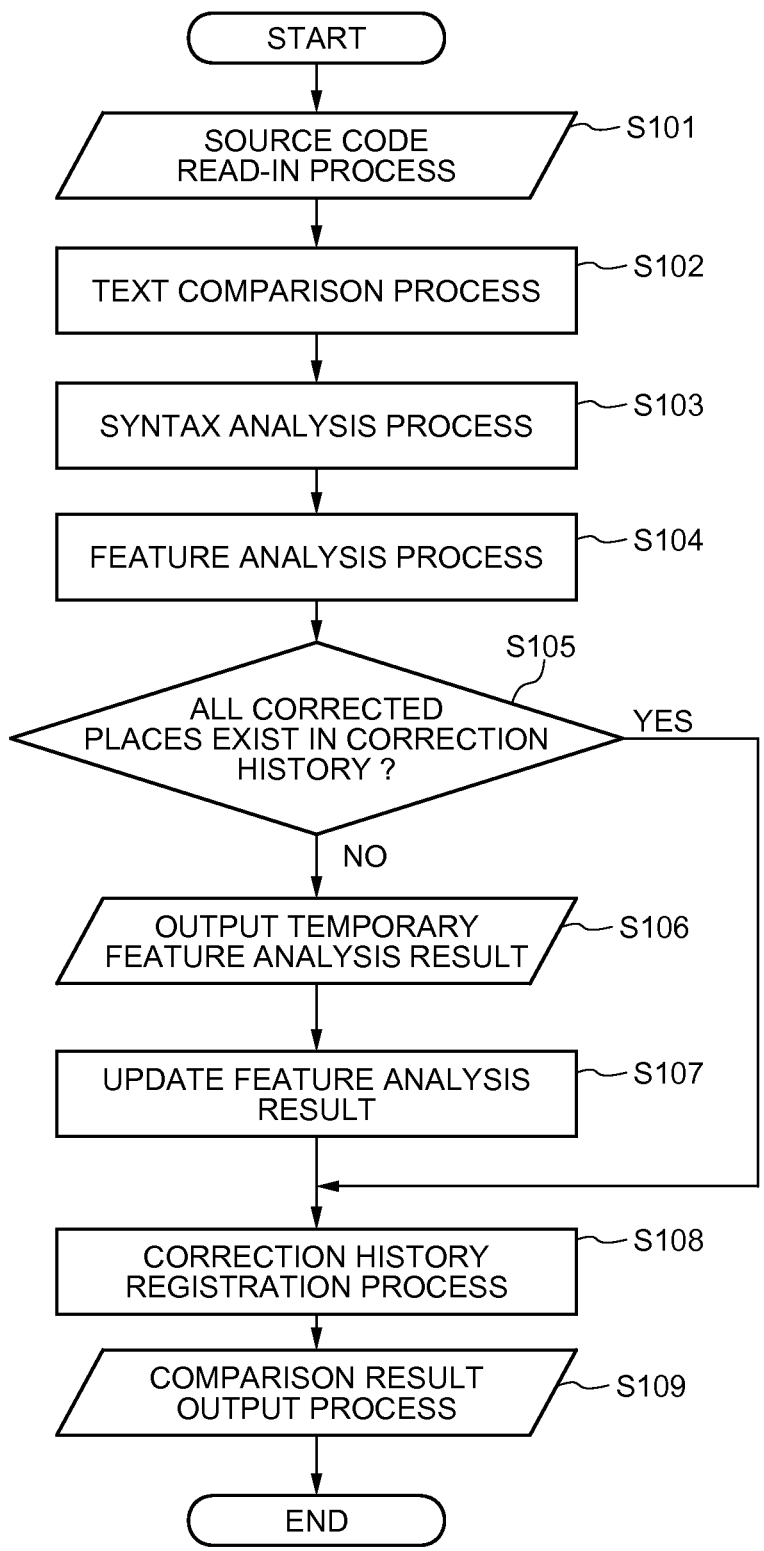
FIG. 10 is a flowchart for explaining operations in comparing uncorrected and corrected source codes.
Figure 11:
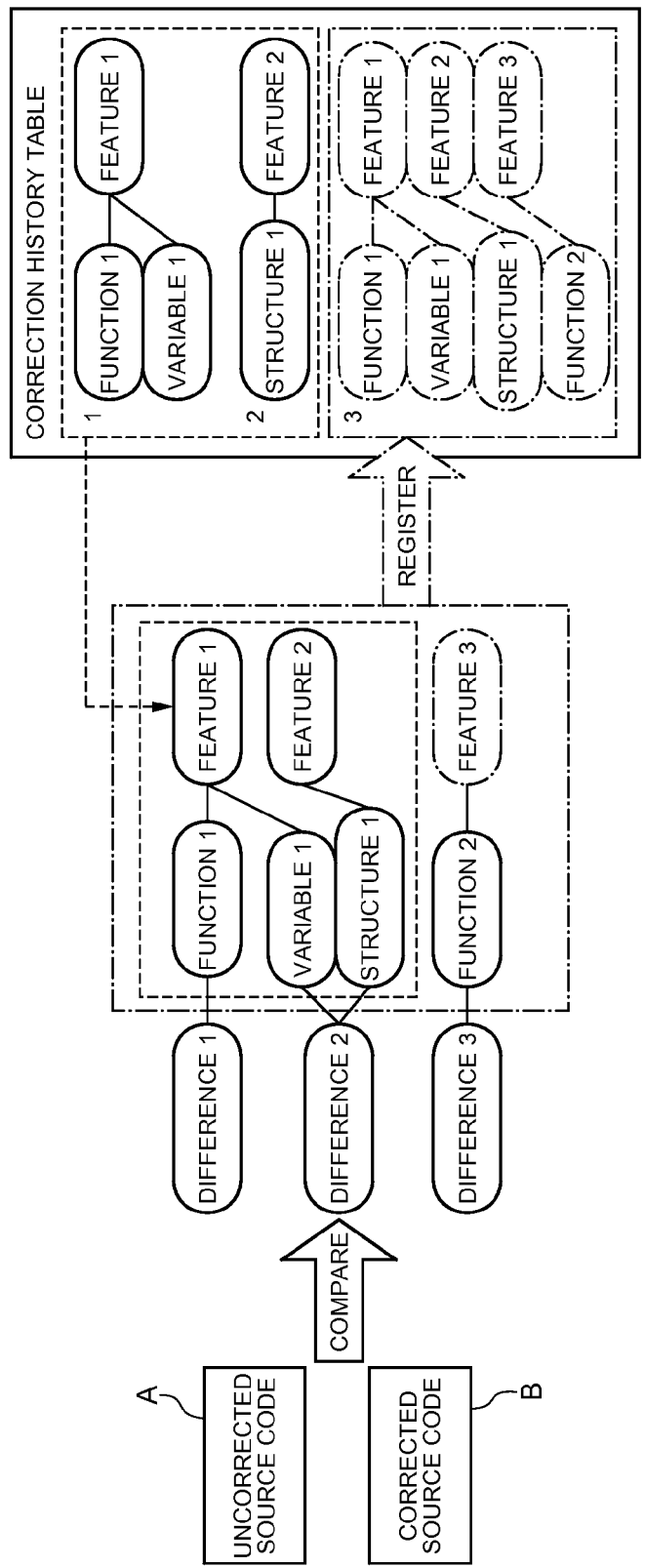
FIG. 11 is a pattern diagram exemplifying a state of data transition in comparing uncorrected and corrected source codes.

Next, referring to FIGS. 10 and 11, explanations will be made with respect to operations in comparing uncorrected and corrected source codes. FIG. 10 is a flowchart for explaining the operations in comparing uncorrected and corrected source codes. FIG. 11 is a diagram modally showing a state of data transition in comparing uncorrected and corrected source codes.

First, a source code read-in process is carried out to read in an uncorrected source code A and the corrected source code B from an input device 2 (step S101).

Next, the difference extraction portion 11 carries out a text comparison process for extracting differences by comparing the texts of the uncorrected source code A and the corrected source code B (step S102). In FIG. 11, as the differences between the uncorrected source code A and the corrected source code B, "difference 1", "difference 2", and "difference 3" are extracted.

Next, the syntax analysis portion 12 carries out a syntax analysis process for enumerating components of correction objects from the differences extracted in the step S102 and dividing the differences according to each component to generate a syntax analysis result (step S103). In FIG. 11, as the components included in the "difference 1", "difference 2"

and "difference 3", "function 1", "variable 1", "structure 1", and "function 2" are enumerated.

Next, the feature analysis portion 13 carries out a feature analysis process for determining, by referring to the correction history table 31, the feature divisions corresponding to the components included in the syntax analysis result generated in the step S103, and generating a feature analysis result (step S104). In FIG. 11, referring to the correction history table, the "feature 1" and "feature 2" existing in the correction history table are determined as the feature divisions corresponding to the components enumerated from the differences.

The feature analysis portion 13 determines whether or not all components (corrected places) included in the syntax analysis result generated in the step S103 exist in the correction history table 31 (step S105). If this determination is YES (step S105: YES), then the process shifts to the aftermentioned step S108.

On the other hand, if the step S105 determines that any of the components (corrected places) included in the syntax analysis result does not exist in the correction history table 31 (step S105: NO), then the feature analysis portion 13 causes the output device 4 to display the feature analysis result at this point of time as a temporary feature analysis result (step S106), and urges the user to input a "new feature" to a provisionally set feature division. In FIG. 11, the user is urged to input it for the feature division corresponding to the "function 2" enumerated from the "difference 3".

Next, when accepting the input to the provisionally set feature division from the user, the feature analysis portion 13 updates the feature analysis result by changing the feature division of provisionally setting the "new feature" of the temporary feature analysis result to the inputted feature division (step S107). In FIG. 11, the feature division corresponding to the "function 2" enumerated from the "difference 3" is changed in the setting to the "feature 3".

Next, the correction history registration portion 14 carries out a correction history registration process for registering the correction history on the correction history table 31 based on the feature analysis result generated in the step S104 or the feature analysis result updated in the step S107 (step S108). In FIG. 11, the correction history data of the history number "3" is additionally registered on the correction history table.

Next, the comparison result output portion 15 carries out a comparison result output process for causing the output device 4 to display the comparison result indicating the result of comparing the uncorrected and corrected source codes (step S109).

As described above, according to the source code comparison device 1 in the exemplary embodiment, because the corrected places can be associated with the features based on the correction history built up in the past, it is possible to simply carry out a correct association based on the actual correction record of the past.

Further, for a new corrected place without a correction history, because the user is urged to input the feature corresponding to the new corrected place so as to register the feature inputted by the user, in the case of adding a new code or a new feature, it is possible to reliably prevent any omission of the registration.

Further, because it is possible to associate a corrected place with a feature and additionally register the both at each time of the correction to accumulate the association information, a program development can be made referring to the past association information, thereby allowing for improving the work efficiency in the development.

[Modification]

Further, the exemplary embodiment described above is merely an exemplification, and thus by no means excludes the applying of various modifications and techniques which are not described explicitly in the exemplary embodiment. That is, the present invention can be practiced after being modified in various forms without departing from its true spirit or scope.

For example, the source code comparison device 1 of the above exemplary embodiment includes the respective portions shown in FIG. 1. However, it may further include a propriety examination portion. The propriety examination portion refers to the correction history table 31, and calculates the proportion (correction ratio) of each component corrected with respect to each feature division as a component belonging to the feature division. If any component, with which the correction ratio of each component calculated with respect to each feature division is not lower than a predetermined threshold value, is not set as the component corresponding to a feature division in the feature analysis result, then the propriety examination portion notifies the user of the impropriety of the correction.

Figure 12:
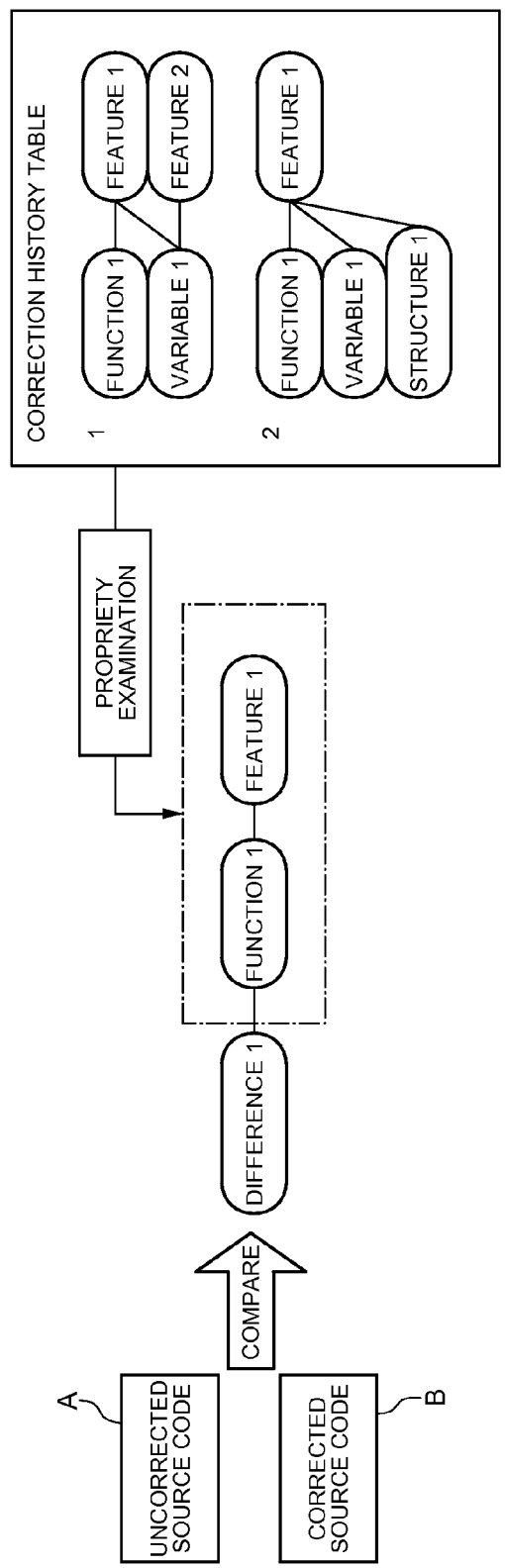
FIG. 12 is a pattern diagram showing an example when a propriety examination portion in accordance with a modification examines a correction propriety.

Referring to FIGS. 12 to 14, the function of the propriety examination portion will be explained in particular. FIG. 12 is a diagram modally showing an example when the propriety examination portion examines a correction propriety. FIG. 13 is a diagram showing an example of the correction ratio of each component calculated according to each feature division. FIG. 14 is a diagram exemplifying a corresponding relationship between the past correction ratio and the current correction situation in component units of the feature division.

The propriety examination portion refers to the correction history table shown in FIG. 12, and calculates the correction ratio of each component according to each feature division shown in FIG. 13. The correction history table of FIG. 12 has accumulated, as the correction history, two respective comparison results identified by the history number "1" and the history number "2". The "feature 1" is the correction object with both results, while the "feature 2" is the correction object only with the history number "1".

When the "feature 1" is corrected, because the "function 1" and the "variable 1" are corrected in both results, the correction ratio of the "function 1" and the "variable 1" is 100%; on the other hand, because the "structure 1" is corrected only with the history number "2", the correction ratio of the "structure 1" is 50% (see FIG. 13).

When the "feature 2" is corrected, because the "variable 1" is corrected, the correction ratio of the "variable 1" is 100%; on the other hand, because the "function 1" and "structure 1" are not corrected, the correction ratio of the "function 1" and "structure 1" is 0% (see FIG. 13).

That is, the propriety examination portion can be described to calculate, according to each component based on the correction history, a proportion (correction ratio) of the number of times of carrying out the correction to the source code, including a change in a portion corresponding to a certain component associated with a feature division, with respect to the number of times of carrying out the correction to the source code, including a change in a portion corresponding to arbitrary components associated with each feature division.

The propriety examination portion refers to the correction ratio of each component according to each feature division shown in FIG. 13 and, if any component, with which the correction ratio is not lower than a predetermined threshold value for the feature division to be examined, is not set as the component corresponding to a feature division in the feature analysis result, then the propriety examination portion notifies the user of the impropriety of the correction.

As shown in FIG. 12, if the uncorrected and corrected source codes A and B are compared, then the combination of the "function 1" and the "feature 1" is set as the "difference 1" in the feature analysis result. FIG. 14 shows a corresponding relationship between the correction ratio of each component of the "feature 1" shown in FIG. 13 and the situation of the current correction. If the threshold value of correction ratio is supposed to be set at 90%, then the components with the correction ratio not lower than the threshold value are the "function 1" and the "variable 1". In the current correction about the "feature 1", because only the "function 1" is corrected, the propriety examination portion determines that the "variable 1" is omitted from the correction, and notifies the user of the omission.

That is, the propriety examination portion can be described as to notify the user of impropriety of the correction if the extracted difference does not include the portions corresponding to the components, when the feature divisions are set for at least one of the divided differences included in the syntax analysis result and the proportion (correction ratio) is equal to or higher than a predetermined threshold value with respect to the group of the feature division, and a certain component associated with the feature division.

Further, the content of notification to the user is not limited to the omission of correction. For example, if components are corrected whose past correction ratio is not higher than a second threshold value, then it is also possible to determine that as a correction error, and notify the user of the error.

By including such a propriety examination portion, it is possible to determine the propriety of the current correction based on the past correction history, thereby allowing for further improving the work efficiency in the program development.

Figure 15:
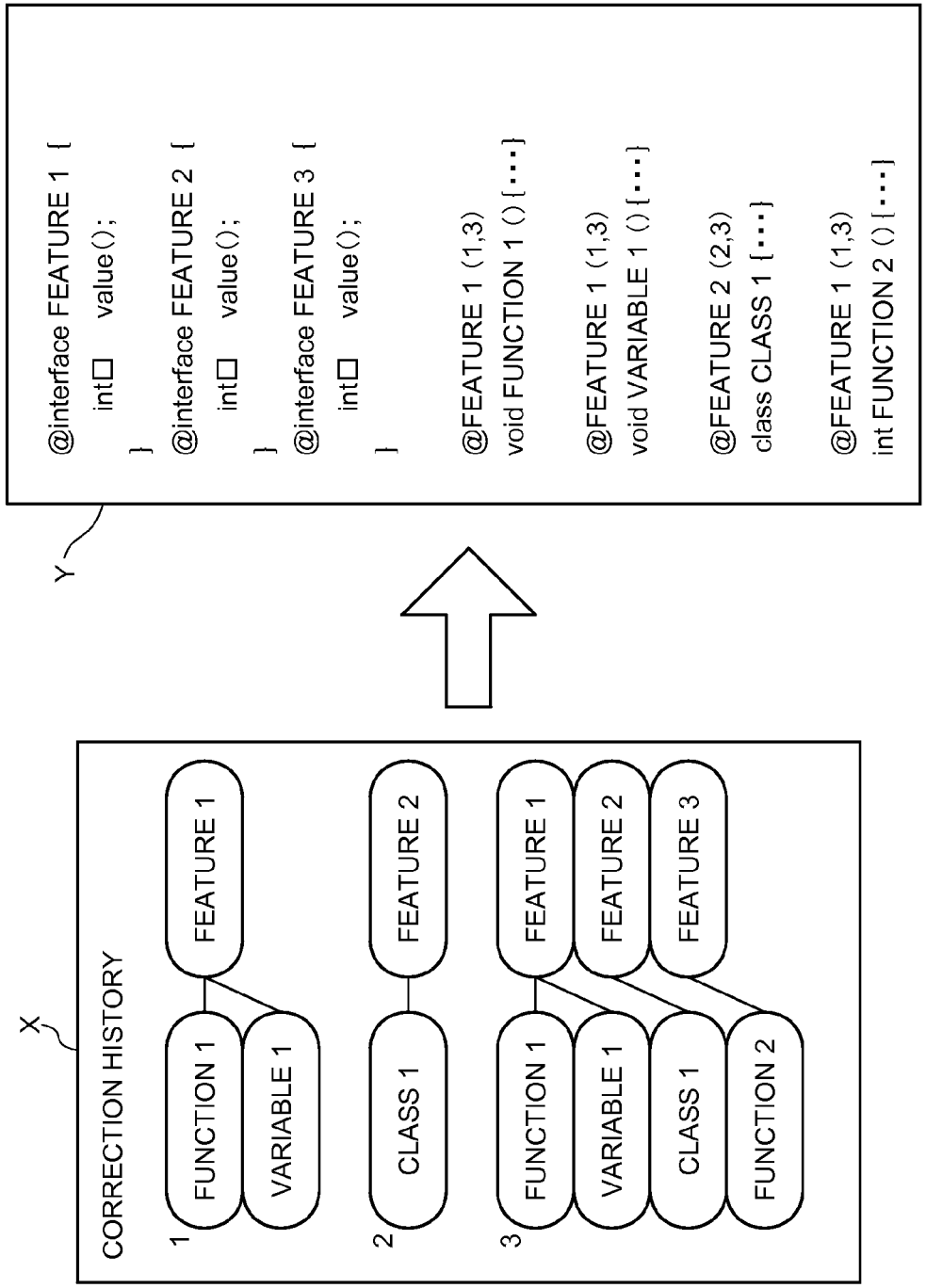
FIG. 15 is a pattern diagram showing an example of writing a correction history into a source code to save the same.

Further, although the correction history is stored and saved in the correction history table 31 in the above exemplary embodiment, the method for saving the correction history is not limited to this. As shown in FIG. 15 for example, the correction history may as well be saved by writing the same into the source code to be compared. FIG. 15 shows an example of embedding a correction history X as annotations into a source code Y in the Java (trademark) language. The annotation corresponding to each feature division is defined to be part of the source code Y. Each annotation is taken to be a single-valued annotation having an int-type array. The annotation having set the corresponding history number is inserted into the description place of the corresponding component. By virtue of this, it is possible to realize the editing of the source code and the referring to the correction history with one source code, thereby allowing for improving the work efficiency in confirmation of the correction content, program development, and the like.

That is, the source code comparison device 1 may as well include a correction history incorporation portion incorporating, into the corrected source code as the correction history, the information associating the feature division set by the feature analysis portion 13 for a divided difference with the component associated with the divided difference in the syntax analysis result.

Further, the whole or part of the exemplary embodiment disclosed above may also be described as the following supplementary notes, but the present invention is not limited thereto.

(Supplementary Note 1)

A source code comparison device comprising:

a difference extraction portion extracting a difference by comparing a source code before correction and the source code after correction;

a syntax analysis portion dividing the difference extracted by the difference extraction portion according to each component usable in the source code, and generating a syntax analysis result having associated the components with divided differences which are differences into which the difference has been divided;

a feature analysis portion generating a feature analysis result by setting a feature division in association with the group of the components and the divided differences included in the syntax analysis result; and an output portion outputting a comparison result between the source code before correction and the source code after correction, using the divided differences and the feature divisions included in the feature analysis result, wherein if the components included in the syntax analysis result exist in a correction history built up based on a result of comparing the source codes in the past, then the feature analysis portion sets the feature divisions set in the correction history in association with the components to the feature divisions of the feature analysis result corresponding to the components.

(Supplementary Note 2)

The source code comparison device according to Supplementary Note 1, wherein if the components included in the syntax analysis result do not exist in the correction history, then the feature analysis portion provisionally sets divisions indicating that the components do not exist to the feature divisions of the feature analysis result corresponding to the components, and urges a user to input for the provisionally set feature divisions.

(Supplementary Note 3)

The source code comparison device according to Supplementary Note 2, wherein when accepting the input from the user for the provisionally set feature divisions, the feature analysis portion updates the feature analysis result by changing the provisionally set feature divisions to the inputted feature divisions.

(Supplementary Note 4)

The source code comparison device according to any of Supplementary Notes 1 to 3 further comprising a propriety examination portion referring to the correction history, calculating, according to each feature division, a ratio of the components corrected as the components belonging to the feature division, and notifying the user of impropriety of the correction if the components with the ratio higher than a predetermined threshold are not set as the components corresponding to the feature divisions of the feature analysis result.

(Supplementary Note 5)

The source code comparison device according to any of Supplementary Notes 1 to 4 further comprising a correction history storage portion causing a storage device to store, as the correction history, the feature analysis result generated by the feature analysis portion.

(Supplementary Note 6)

The source code comparison device according to any of Supplementary Notes 1 to 5 further comprising a correction history incorporation portion incorporating the feature analysis result generated by the feature analysis portion into the source code after correction as the correction history.

(Supplementary Note 7)

A source code comparison method comprising:

a difference extraction step of extracting a difference by comparing a source code before correction and the source code after correction;

a syntax analysis step of dividing the difference extracted in the difference extraction step according to each component usable in the source code, and generating a syntax analysis result having associated the components with divided differences which are differences into which the difference has been divided;

a feature analysis step of generating a feature analysis result by setting a feature division in association with the group of the components and the divided differences included in the syntax analysis result; and an output step of outputting a comparison result between the source code before correction and the source code after correction, using the divided differences and the feature divisions included in the feature analysis result, wherein if the components included in the syntax analysis result exist in a correction history built up based on a result of comparing the source codes in the past, then the feature analysis step sets the feature divisions set in the correction history in association with the components to the feature divisions of the feature analysis result corresponding to the components.

(Supplementary Note 8)

A source code comparison program comprising instructions for causing a computer to carry out each step according to Supplementary Note 7.

The invention claimed is:

1. A source code comparison device comprising:
   a central processing unit;
   a memory storing a source code program comprising executable instructions for causing the central processing unit to carry out a process including:
      a difference extraction portion extracting a difference between a source code before correction and the source code after correction;
      a syntax analysis portion dividing the extracted difference into divided differences which are portions corresponding to components usable in the source code, and generating a syntax analysis result having associated the divided differences with the components corresponding to the divided differences;
      a feature analysis portion setting a feature division for each of the divided differences included in the syntax analysis result; and
      an output portion outputting a comparison result having associated the divided differences with the feature division set for the divided differences,
   wherein if the components included in the syntax analysis result is included in a correction history having associated the components with the feature division, then the feature analysis portion is configured to set the feature division associated with the components in the correction history for the divided differences associated with the components in the syntax analysis result,
   wherein the source code comparison device further comprises:
      a propriety examination portion,
   wherein the correction history is information having associated information for identifying a correction to the source code with the components and the feature division; and
   wherein the propriety examination portion calculates, based on the correction history, a ratio of a number of times of carrying out the correction to the source code, including a change in a portion corresponding to a certain component associated with a feature division, with respect to a number of times of carrying out the correction to the source code, including a change in a portion corresponding to an arbitrary component associated with the feature division, and notifies a user of impropriety of the correction if the extracted difference does not include the portion corresponding to the certain components, when the feature division is set for at least one of the divided differences included in the syntax analysis result and the ratio is equal to or higher than a predetermined threshold value.

2. The source code comparison device according to claim 1, wherein if the components included in the syntax analysis result is not included in the correction history, then the feature analysis portion is configured to provisionally set, as the feature division, information indicating that the components are not included in the correction history, for the divided differences associated with the components in the syntax analysis result, and to urge a user to input information for the provisionally set feature division.

3. The source code comparison device according to claim 2, wherein when accepting the information inputted by the user for the provisionally set feature division, the feature analysis portion is configured to set the information for the divided differences as the feature division by changing the provisionally set feature division to an accepted information.

4. The source code comparison device according to claim 1 further comprising:
   a correction history registration portion storing, into a storage device as the correction history, information having associated the feature division set by the feature analysis portion for the divided differences with the components associated with the divided differences in the syntax analysis result.

5. The source code comparison device according to claim 1 further comprising:
   a correction history incorporation portion incorporating, into the source code after correction as the correction history, information having associated the feature division set by the feature analysis portion for the divided differences with the components associated with the divided differences in the syntax analysis result.

6. A source code comparison method comprising:
   a difference extraction step of extracting a difference between a source code before correction and the source code after correction;
   a syntax analysis step of dividing the extracted difference into divided differences which are portions corresponding to components usable in the source code, and generating a syntax analysis result having associated the divided differences with the components corresponding to the divided differences;
   a feature analysis step of setting a feature division for each of the divided differences included in the syntax analysis result; and
   an output step of outputting a comparison result having associated the divided differences with the feature division set for the divided differences,
   wherein if the components included in the syntax analysis result is included in a correction history having associated the components with the feature division, then the feature analysis step is configured to set the feature division associated with the components in the correction history for the divided differences associated with the components in the syntax analysis result wherein the source code comparison method further comprises:
a propriety examination step,
wherein the correction history is information having associated information for identifying a correction to the source code with the components and the feature division; and
wherein the propriety examination step calculates, based on the correction history, a ratio of a number of times of carrying out the correction to the source code, including a change in a portion corresponding to a certain component associated with a feature division, with respect to a number of times of carrying out the correction to the source code, including a change in a portion corresponding to an arbitrary component associated with the feature division, and notifies a user of impropriety of the correction if the extracted difference does not include the portion corresponding to the certain components, when the feature division is set for at least one of the divided differences included in the syntax analysis result and the ratio is equal to or higher than a predetermined threshold value.

7. A non-transitory computer-readable storage medium storing a source code comparison program comprising executable instructions for causing a computer to carry out a process including:
a difference extraction step of extracting a difference between a source code before correction and the source code after correction;
a syntax analysis step of dividing the extracted difference into divided differences which are portions corresponding to components usable in the source code, and generating a syntax analysis result having associated the divided differences with the components corresponding to the divided differences;
a feature analysis step of setting a feature division for each of the divided differences included in the syntax analysis result; and
an output step of outputting a comparison result having associated the divided differences with the feature division set for the divided differences,
wherein if the components included in the syntax analysis result is included in a correction history having associated the components with the feature division, then the feature analysis step is configured to set the feature division associated with the components in the correction history for the divided differences associated with the components in the syntax analysis result,
wherein the process further comprises:
a propriety examination step,
wherein the correction history is information having associated information for identifying a correction to the source code with the components and the feature division; and
wherein the propriety examination step calculates, based on the correction history, a ratio of a number of times of carrying out the correction to the source code, including a change in a portion corresponding to a certain component associated with a feature division, with respect to a number of times of carrying out the correction to the source code, including a change in a portion corresponding to an arbitrary component associated with the feature division, and notifies a user of impropriety of the correction if the extracted difference does not include the portion corresponding to the certain components, when the feature division is set for at least one of the divided differences included in the syntax analysis result and the ratio is equal to or higher than a predetermined threshold value.

\* \* \* \* \*